(12) United States Patent
Pandurangan et al.

(10) Patent No.: US 8,589,814 B2
(45) Date of Patent: Nov. 19, 2013

(54) SYSTEM AND METHOD FOR VISUAL PRESENTATION OF INFORMATION IN A PROCESS CONTROL SYSTEM

(75) Inventors: Gobinath Pandurangan, Bangalore (IN); Pravin Wamanrao Shende, Bangalore (IN); Chandrakanth Vittal, Bangalore (IN); Rakesh Kumar C. Mehta, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 762 days.

(21) Appl. No.: 12/762,185

(22) Filed: Apr. 16, 2010

(65) Prior Publication Data

US 2011/0258568 A1 Oct. 20, 2011

(51) Int. Cl.
*G06F 3/048* (2013.01)

(52) U.S. Cl.
USPC .................. 715/771; 715/772; 715/764

(58) Field of Classification Search
USPC .......................... 715/771, 772, 764
See application file for complete search history.

(56) References Cited

U.S. PATENT DOCUMENTS

| | | | |
|---|---|---|---|
| 5,576,946 A | 11/1996 | Bender et al. | |
| 5,631,825 A | 5/1997 | van Weele et al. | |
| 5,896,138 A | 4/1999 | Riley | |
| 6,473,660 B1 | 10/2002 | Thibault | |
| 6,901,560 B1* | 5/2005 | Guerlain et al. | 715/833 |
| 6,975,914 B2 | 12/2005 | DeRemer et al. | |
| 7,242,991 B2 | 7/2007 | Budinger et al. | |
| 2003/0016206 A1 | 1/2003 | Taitel | |
| 2003/0217053 A1 | 11/2003 | Bachman et al. | |
| 2003/0217054 A1 | 11/2003 | Bachman et al. | |
| 2003/0220707 A1 | 11/2003 | Budinger et al. | |
| 2003/0225462 A1 | 12/2003 | Bachman et al. | |
| 2003/0225469 A1 | 12/2003 | DeRemer et al. | |
| 2004/0002950 A1 | 1/2004 | Brennan et al. | |
| 2004/0111194 A1 | 6/2004 | Wie | |
| 2007/0132779 A1 | 6/2007 | Gilbert et al. | |
| 2007/0161125 A1 | 7/2007 | Rosenfeld et al. | |
| 2008/0244449 A1 | 10/2008 | Morrison et al. | |

FOREIGN PATENT DOCUMENTS

| | | |
|---|---|---|
| WO | WO 03/089995 A2 | 10/2003 |
| WO | WO 2004/032392 A2 | 4/2004 |
| WO | WO 2008/063928 A2 | 5/2008 |
| WO | WO 2008/118891 A2 | 10/2008 |

OTHER PUBLICATIONS

Notification of Transmittal of the International Search Report and the Written Opinion of the International Searching Authority, or the Declaration dated Oct. 4, 2011 in connectio with International Patent Application No. PCT/US2011/029919.

\* cited by examiner

*Primary Examiner* — Omar Abdul-Ali

(57) ABSTRACT

Various graphical displays used for visualization of control techniques in a process control system can be provided to an operator. For example, the graphical display could include an image associated with a portion of a process and icons that are associated with corresponding process variables. At least some of the icons include a symbol that represents a change of one value of the associated process variable relative to another value of the process variable. Another graphical display could include a pigeonhole display that includes visual elements associated with corresponding process variables. Selection of a visual element could present the operator with a peephole display that includes information associated with process variables associated with the selected visual element. Each visual element displays layers of information that are associated with its process variable.

20 Claims, 14 Drawing Sheets

FIG. 4A   FIG. 4B

SYSTEM AND METHOD FOR VISUAL PRESENTATION OF INFORMATION IN A PROCESS CONTROL SYSTEM

TECHNICAL FIELD

This disclosure relates generally to process control systems. More specifically, this disclosure relates to a system and method for visual presentation of information in a process control system.

BACKGROUND

Processing facilities are often managed using process control systems. Example processing facilities include manufacturing plants, chemical plants, crude oil refineries, ore processing plants, and paper or pulp manufacturing and processing plants. Among other operations, process control systems typically manage the use of motors, valves, and other industrial equipment in the processing facilities.

Applications in a process control system may include process controllers, which are often used to control the operation of the industrial equipment in the processing facilities. The process controllers could, for example, monitor controlled variables and disturbance variables to determine the operation of the industrial equipment, output manipulated variables to the process being controlled, and generate alarms when malfunctions are detected. Data relating to the state of applications, process controllers, and variables may be displayed to an operator or other individual in tabular or graphical formats.

SUMMARY

This disclosure provides a system and method for visual presentation of information in a process control system.

In a first embodiment, a method includes presenting a graphical display to an operator on an operator station. The graphical display includes an image associated with a portion of a process. The graphical display also includes icons that are associated with corresponding process variables. The process variables are associated with the portion of the process. At least some of the icons include a symbol. The symbol represents a characteristic of a change of a first value of the associated process variable. The change of the first value is determined relative to a second value of the associated process variable.

In a second embodiment, a method includes presenting a pigeonhole display to an operator on an operator station. The pigeonhole display includes visual elements associated with corresponding process variables. The process variables are associated with a portion of a process. The method also includes receiving from the operator a selection of one or more of the visual elements. The method further includes presenting a peephole display to the operator within the pigeonhole display. The peephole display includes information associated with one or more of the process variables associated with the selected visual elements. Each visual element displays one or more layers of information that are associated with its associated process variable.

In a third embodiment, a computer program is embodied on a tangible computer readable medium. The computer program includes computer readable program code for presenting a pigeonhole display to an operator on an operator station. The pigeonhole display includes visual elements associated with corresponding process variables. The process variables are associated with a portion of a process. The computer program also includes computer readable program code for receiving from the operator a selection of one or more of the visual elements. The computer program further includes computer readable program code for presenting a peephole display to the operator within the pigeonhole display. The peephole display includes information associated with one or more of the process variables associated with the selected visual elements. Each visual element displays one or more layers of information associated with its associated process variable.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 16, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
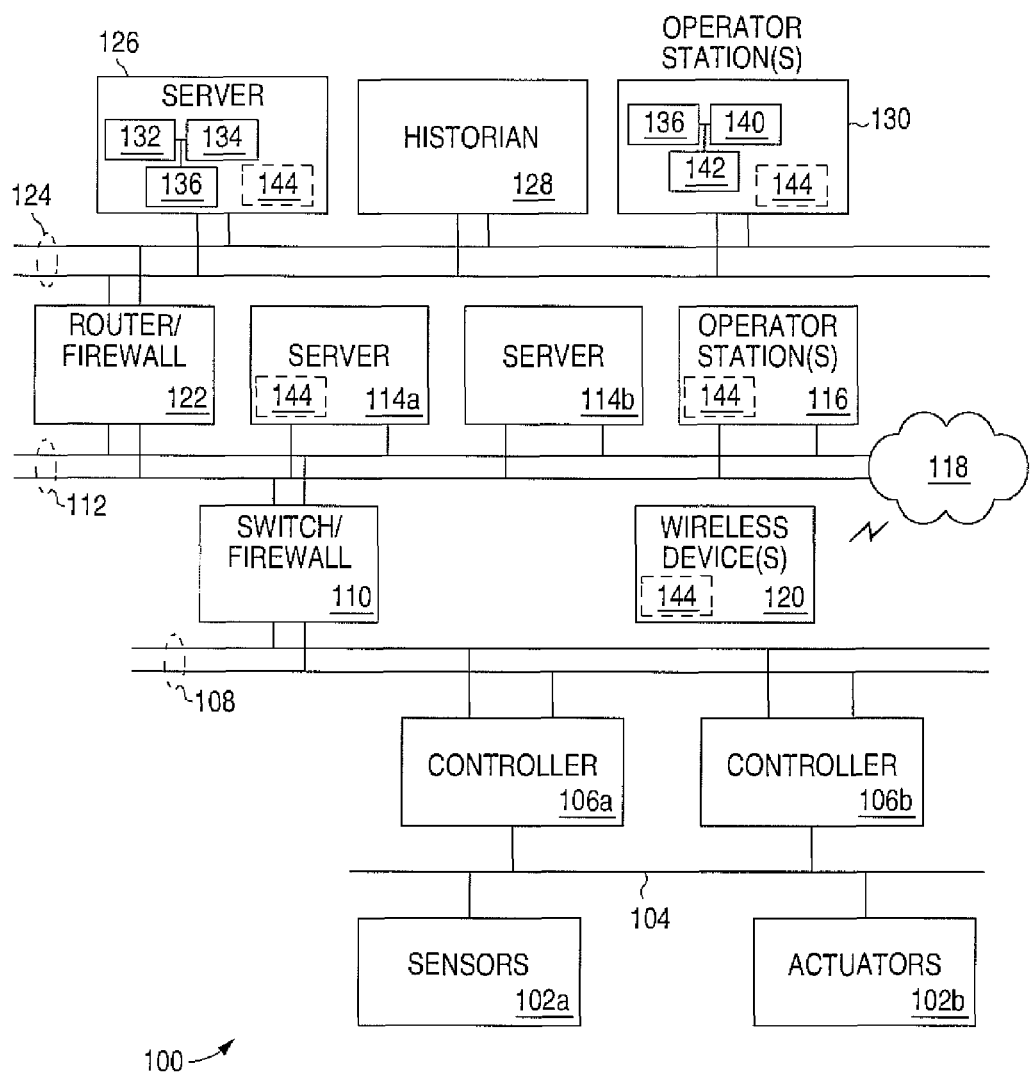
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 may be used without departing from the scope of this disclosure.

In this example embodiment, the process control system 100 includes various components that facilitate production or processing of at least one product or other material, such as one or more sensors 102a and one or more actuators 102b. The sensors 102a and actuators 102b represent components in a process system that may perform any of a wide variety of functions. For example, the sensors 102a could measure a wide variety of characteristics in a process system, such as temperature, pressure, or flow rate. Also, the actuators 102b could alter a wide variety of characteristics in the process system and could represent components such as heaters, motors, or valves. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting conditions in a process system. Also, a process system may generally represent any system or portion thereof configured to process one or more products or other materials in some manner.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

Two controllers 106a-106b are coupled to the network 104. The controllers 106a-106b may, among other things, use the measurements from the sensors 102a to control the operation of the actuators 102b. For example, the controllers 106a-106b could receive measurement data from the sensors 102a and use the measurement data to generate control signals for the actuators 102b. Each of the controllers 106a-106b includes any hardware, software, firmware, or combination thereof for interacting with the sensors 102a and controlling the actuators 102b. The controllers 106a-106b could, for example, represent multivariable predictive control (MPC) controllers or other types of controllers that implement control logic (such as logic associating sensor measurement data to actuator control signals). Each of the controllers 106a-106b could, for example, represent a computing device running a MICROSOFT WINDOWS operating system.

Two networks 108 are coupled to the controllers 106a-106b. The networks 108 facilitate interaction with the controllers 106a-106b, such as by transporting data to and from the controllers 106a-106b. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

Two servers 114a-114b are coupled to the networks 112. The servers 114a-114b perform various functions to support the operation and control of the controllers 106a-106b, sensors 102a, and actuators 102b. For example, the servers 114a-114b could log information collected or generated by the controllers 106a-106b, such as measurement data from the sensors 102a or control signals for the actuators 102b. The servers 114a-114b could also execute applications that control the operation of the controllers 106a-106b, thereby controlling the operation of the actuators 102b. In addition, the servers 114a-114b could provide secure access to the controllers 106a-106b. Each of the servers 114a-114b includes any hardware, software, firmware, or combination thereof for providing access to, control of, or operations related to the controllers 106a-106b. Each of the servers 114a-114b could, for example, represent a computing device running a MICROSOFT WINDOWS operating system.

One or more operator stations 116 are coupled to the networks 112. The operator stations 116 represent computing or communication devices providing user access to the servers 114a-114b, which could then provide user access to the controllers 106a-106b (and possibly the sensors 102a and actuators 102b). As particular examples, the operator stations 116 could allow users to review the operational history of the sensors 102a and actuators 102b using information collected by the controllers 106a-106b and/or the servers 114a-114b. The operator stations 116 could also allow the users to adjust the operation of the sensors 102a, actuators 102b, controllers 106a-106b, or servers 114a-114b. In addition, the operator stations 116 could receive and display warnings, alerts, or other messages or displays generated by the controllers 106a-106b or the servers 114a-114b. Each of the operator stations 116 includes any hardware, software, firmware, or combination thereof for supporting user access and control of the system 100. Each of the operator stations 116 could, for example, represent a computing device running a MICROSOFT WINDOWS operating system.

In this example, the system 100 also includes a wireless network 118, which can be used to facilitate communication with one or more wireless devices 120. The wireless network 118 may use any suitable technology to communicate, such as radio frequency (RF) signals. Also, the wireless devices 120 could represent devices that perform any suitable functions. The wireless devices 120 could, for example, represent wireless sensors, wireless actuators, and remote or portable operator stations or other user devices.

At least one router/firewall 122 couples the networks 112 to two networks 124. The router/firewall 122 includes any suitable structure for providing communication between networks, such as a secure router or combination router/firewall. The networks 124 could represent any suitable networks, such as a pair of Ethernet networks or an FTE network.

In this example, the system 100 includes at least one additional server 126 coupled to the networks 124. The server 126 executes various applications to control the overall operation of the system 100. For example, the system 100 could be used in a processing plant or other facility, and the server 126 could execute applications used to control the plant or other facility. As particular examples, the server 126 could execute applications such as enterprise resource planning (ERP), manufacturing execution system (MES), or any other or additional plant or process control applications. The server 126 includes any hardware, software, firmware, or combination thereof for controlling the overall operation of the system 100.

A historian 128 is also coupled to the networks 124. The historian 128 generally collects information associated with the operation of the system 100. For example, the historian 128 may collect measurement data associated with the operation of the sensors 102a. The historian 128 may also collect control data provided to the actuators 102b. The historian 128 may collect any other or additional information associated with the process control system 100. The historian 128 includes any suitable storage and retrieval device or devices, such as a database.

One or more operator stations 130 are coupled to the networks 124. The operator stations 130 represent computing or communication devices providing, for example, user access to the servers 114a-114b, 126 and the historian 128. Each of the operator stations 130 includes any hardware, software, firmware, or combination thereof for supporting user access and control of the system 100. Each of the operator stations 130 could, for example, represent a computing device running a MICROSOFT WINDOWS operating system.

In particular embodiments, the various servers and operator stations may represent computing devices. For example, each of the servers 114a-114b, 126 could include one or more processors 132 and one or more memories 134 for storing instructions and data used, generated, or collected by the processor(s) 132. Each of the servers 114a-114b, 126 could also include at least one network interface 136, such as one or more Ethernet interfaces. Also, each of the operator stations 116, 130 could include one or more processors 138 and one or more memories 140 for storing instructions and data used, generated, or collected by the processor(s) 138. Each of the operator stations 116, 130 could also include at least one network interface 142, such as one or more Ethernet interfaces.

In one aspect of operation, at least one of the components in the system 100 can implement or support visualization functionality that allows operators to visualize and control the regulatory, advanced process control, optimization, or other control techniques being used in the process control system 100. For example, at least one visualization graphical user interface (GUI) 144 can be used in the system 100 to generate visual displays containing information about the control techniques used in the system 100. A visualization GUI 144 could, among other things, facilitate the identification, monitoring, and control over specific process variables in the system 100.

In general, a process being controlled by the process control system 100 is associated with various "process variables," which represent various aspects of the process. The system 100 may operate by attempting to maintain a "controlled variable" (CV) at or near a desired value (a setpoint) or within a desired operating range (a setpoint range). The system 100 attempts to maintain the controlled variable by altering one or more "manipulated variables" (MVs), such as an opening of a valve or a speed of a turbine. A "disturbance variable" (DV) represents a condition that affects a controlled variable, where the disturbance variable can be considered by the system 100 when altering the manipulated variables but generally cannot be controlled (such as ambient temperature). By controlling certain controlled variables, the system 100 may improve or optimize the process being controlled.

Advanced Process Control (APC), optimization, and other control techniques are routinely used to control industrial processes, such as manufacturing plants, chemical plants, crude oil refineries, and ore processing plants. These techniques could, for example, operate to control one or more controlled variables through the manipulation of one or more manipulated variables and the consideration of one or more disturbance variables. In traditional distributed control system (DCS) environments, visualization is typically done by exception and out-of-the-normal workflow of an operator. In other words, visualization may not be part of the normal workflow or routine of the operator. This often results in the operator missing or ignoring important information that could provide operational improvements or that could be used to avoid or mitigate abnormal situations. This often then results in a loss of confidence in an application and ultimately the application being deactivated or over-constrained to the point where it provides little or no operational or economic benefit.

In accordance with this disclosure, the visualization GUI 144 supports visualization of regulatory, APC, optimization, and other control techniques in the process control system 100. In other words, the visualization GUI 144 allows operators to visualize the control techniques being used to control a process and to make adjustments to the control techniques. Moreover, this can be done in a manner that is more consistent with the operator's normal workflow.

In some embodiments, the visualization GUI 144 provides a rich variety of objects (shapes), such as through the use of hypertext markup language (HTML), scripting, and MICROSOFT .NET objects. These objects can be appropriately combined and leveraged as part of the visualization GUI 144, and the visualization GUI 144 can be integrated into the normal workflow of the operator. As a result, the visualization GUI 144 can be used to promote a better understanding of a control application and to promote more appropriate utilization of the application, as well as to drive increased benefits through their usage. As described in more detail below, the objects can include a series of icons, faceplates, charts, trends, and other objects that can be leveraged at a process overview (ASM Level 1), unit overview (ASM Level 2), and equipment overview (ASM Level 3) to impart information on the state, status, condition, and health of the control application. The objects also allow logical "linking" amongst themselves and standard DCS visualizations, which can be used to promote complete integration (and therefore acceptance and utilization) into the operator's visualization/control environment.

The objects used in the visualization GUI 144 to provide the visualization functionality can be used in any suitable environment. For example, the objects could be used in a standard visualization environment that provides other visualizations and displays to an operator. As a particular example, a set of objects for the visualization GUI 144 could be contained in a library within the DCS visualization environment. The objects could also be used as part of a standalone interface, such as a .NET interface, that is then used in conjunction with the DCS visualization environment.

Additional details regarding the visualization GUI 144 are provided below. Each visualization GUI 144 includes any hardware, software, firmware, or combination thereof for generating one or more graphical user interfaces for visualizing control techniques. As a particular example, each visualization GUI 144 could represent a software application or collection of applications executed by the processor(s) in a server, operator station, or other device in the process control system 100.

Although FIG. 1 illustrates one example of a process control system 100, various changes may be made to FIG. 1. For example, a control system could include any number of sensors, actuators, controllers, servers, operator stations, networks, visualization GUIs, and other components. Also, the makeup and arrangement of the process control system 100 in FIG. 1 is for illustration only. Components could be added, omitted, combined, or placed in any other suitable configuration according to particular needs. In addition, FIG. 1 illustrates one operational environment in which visualization of control techniques can be used. This functionality could be used in any other suitable device or system.

FIGS. 2 through 16 illustrate an example graphical user interface for visualization of control techniques in a process control system according to this disclosure. The graphical user interface shown here could, for example, represent the visualization GUI 144 in FIG. 1. The embodiment of the graphical user interface shown in FIGS. 2 through 16 is for illustration only. Other embodiments of the graphical user interface could be used without departing from the scope of this disclosure. Also, for ease of explanation, the graphical user interface of FIGS. 2 through 16 is described with respect to the process control system 100 of FIG. 1. The process control system 100 could use any suitable graphical user interface, and the graphical user interface of FIGS. 2 through 16 could be used with any suitable device and in any suitable system.

Figure 2:
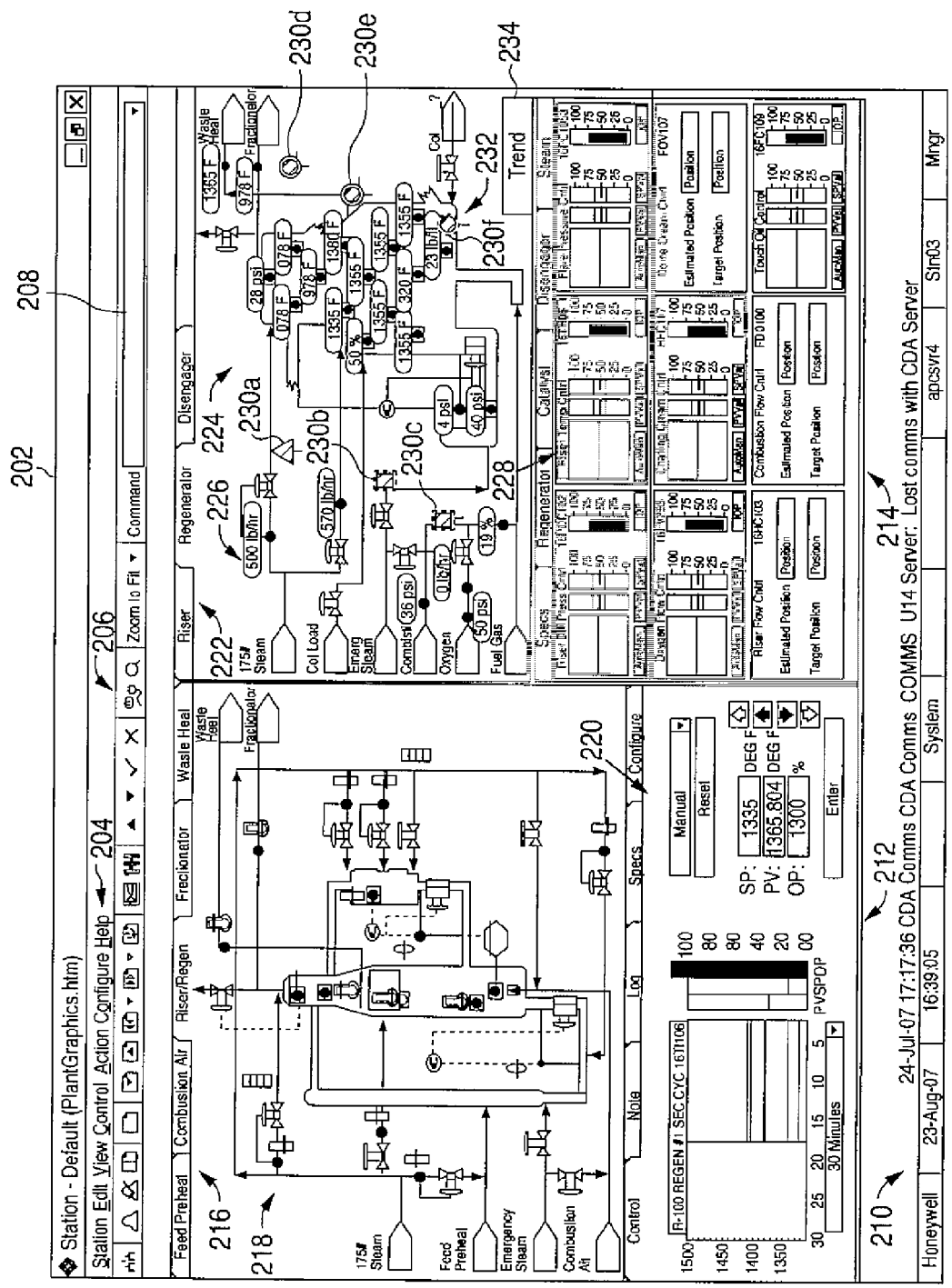
FIGS. 2 through 16 illustrate an example graphical user interface for visualization of control techniques in a process control system according to this disclosure.

As shown in FIG. 2, a display 200 includes a window having a title bar 202, a menu 204, a toolbar 206 (which includes a command line 208), and two lower bars 210 containing various information. The menu 204 and toolbar 206 can be used to navigate to different displays and to invoke different functions. The command line 208 can be used by users to execute command line instructions, which could also be used to navigate and invoke functions. The lower bars 210 can be used to provide various information, such as status and alarm information, to an operator.

The remainder of the display 200 is divided into two display areas 212-214. The first display area 212 graphically illustrates a larger process (or portion thereof), while the second display area 214 graphically illustrates a smaller subsection of the larger process shown in the first display area 212. For example, as shown in FIG. 2, the first display area 212 includes tabs 216, which can be used to select larger portions of a process. An operator can select one of the tabs 216, which causes a graphical image 218 to be displayed in the first display area 212. The image 218 graphically represents the selected portion of the process (which was selected using the tabs 216). In this example, the image 218 represents the various industrial equipment, such as valves and heat exchangers, forming the selected portion of the process. The image 218 also identifies the inputs and outputs of the selected portion of the process. In addition, various controls 220 are provided for controlling the selected portion of the process. For instance, the controls 220 could be used to view trends of specific process variables over time, to establish setpoints for the process variables, and to establish whether the process variables are controlled manually or via a process controller.

The second display area 214 graphically illustrates smaller subsections of the selected portion of the process (which was selected using the tabs 216). Again, the second display area 214 includes tabs 222, which can be used to select specific subsections of the selected portion of the process. As a result, the tabs 216 and 222 can be used to navigate within a much larger process and to select specific subsections of that process. It should be noted, however, that the use of two display areas 212-214 and associated tabs for navigating a process are for illustration only. Any number of display areas and navigation mechanisms could be used to navigate a process.

A graphical image 224 is also displayed in the second display area 214. The image 224 graphically represents the selected subsection of the process (which was selected using the tabs 222). In this example, the image 224 represents the various industrial equipment, such as valves and heat exchangers, forming the selected subsection of the process. The image 224 also identifies the inputs and outputs of the selected subsection, as well as different process values 226 within the selected subsection (such as pressures and temperatures). In addition, various summaries 228 are provided for process variables in the system. The summaries 228 may, for instance, identify estimated and actual values of a process variable, the percentage of the actual process variable value compared to its maximum value, and whether the process variable is within specified limits.

Various icons 230a-230f are also provided in the second display area 214. The icons 230a-230f are associated with different process variables in the process system. As described below, an individual icon 230a-230f can be selected by an operator, which may present the operator with a process variable faceplate that can be used to view additional information associated with and to configure or control a process variable. Moreover, the icons 230a-230f could be associated with checkboxes 232. One or multiple icons 230a-230f can be checked by the operator, and a trend plot can be generated for the selected icon(s) using a trend button 234. In these ways, the display 200 provides a logical way for an operator to view and control various process variables, which can be done in a manner consistent with the operator's normal workflow.

Figure 3:
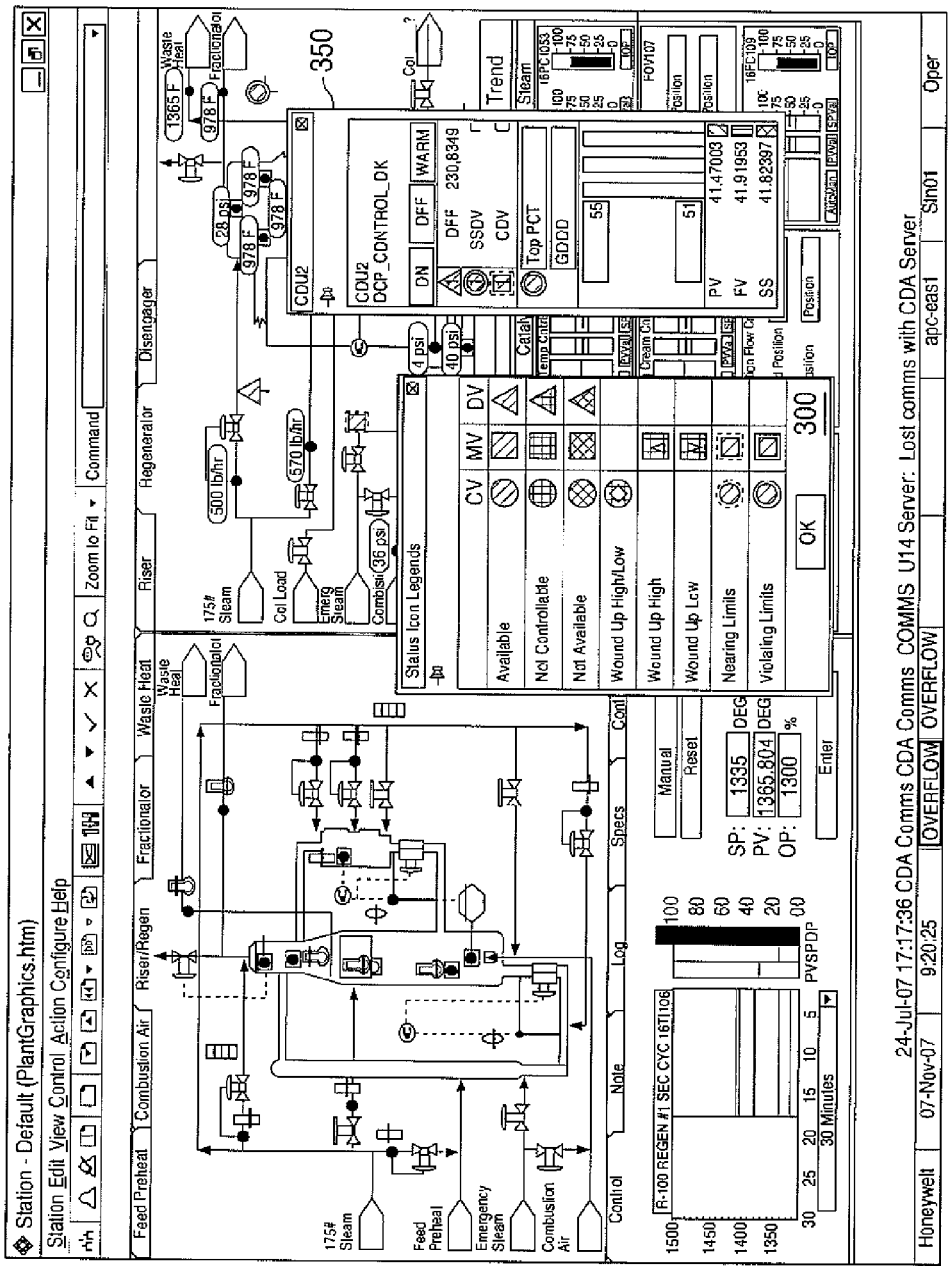

As shown in FIG. 3, a legend 300 can be presented to the operator, where the legend illustrates the different types of icons that can be presented in the display 200. The legend 300 could be provided to the operator in response to any suitable input, such as the appropriate command line command or selection of the appropriate entry in the menu 204, toolbar 206, or right mouse click menu. As shown in this example, circle icons represent controlled variables, square icons represent manipulated variables, and triangle icons represent disturbance variables. Also, the shadings of the icons, halo symbols (or lack thereof) around the icons, and symbols within the icons can be used to represent the status of the variables associated with the icons. For instance, different shadings could indicate whether a variable is available for use by a controller, not controllable by a controller, or not available for use by a controller. Also, a dashed halo symbol around an icon could indicate that the associated variable is approaching one of its limits, while a solid halo symbol around an icon could indicate that the associated variable has violated one of its limits. In addition, symbols within the icons could indicate whether a controlled variable is wound up (cannot be controlled further since all of its manipulated variables are constrained) and whether a manipulated variable is wound up low or high.

It may be noted that while shadings and dashed/solid halo symbols have been described above, any other or additional indicators could be used with the icons. For example, the icons could have colors instead of shadings, such as green for available (and for approaching/violating limits), yellow for not controllable or wound up, and red for not available. Also, the halo symbols could have different colors instead of or in addition to line patterns, such as yellow for nearing a limit and red for violating a limit. In addition, different shapes and shape "deformations" can be used, such as by using a triangle or other shape that has a corner folded over when something changes.

Figure 4C:
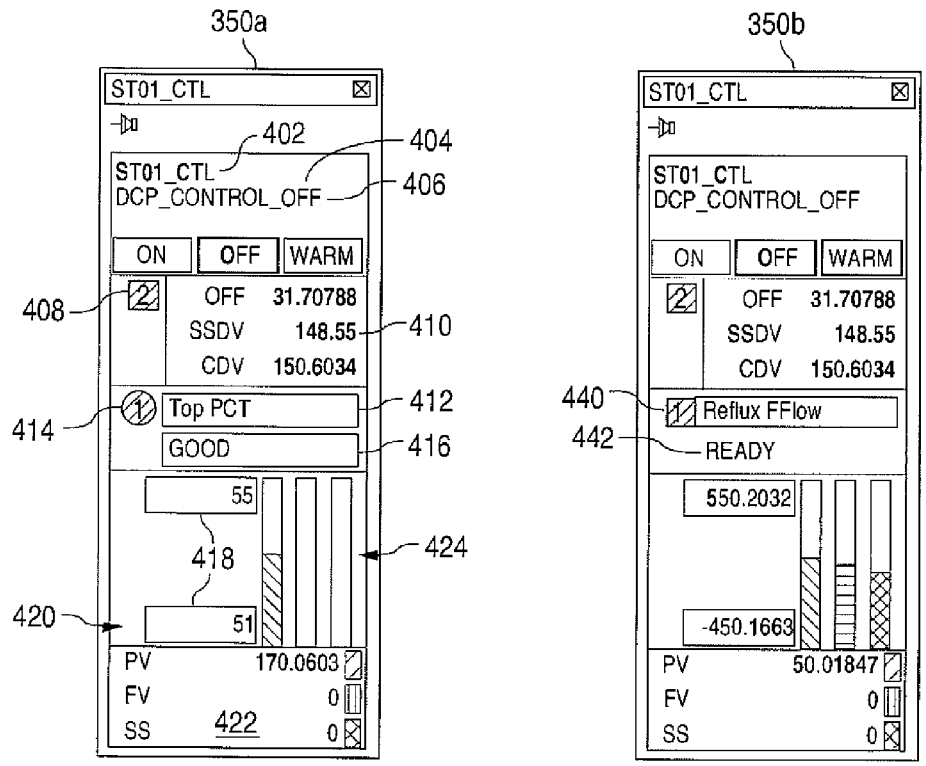
Figure 4C:
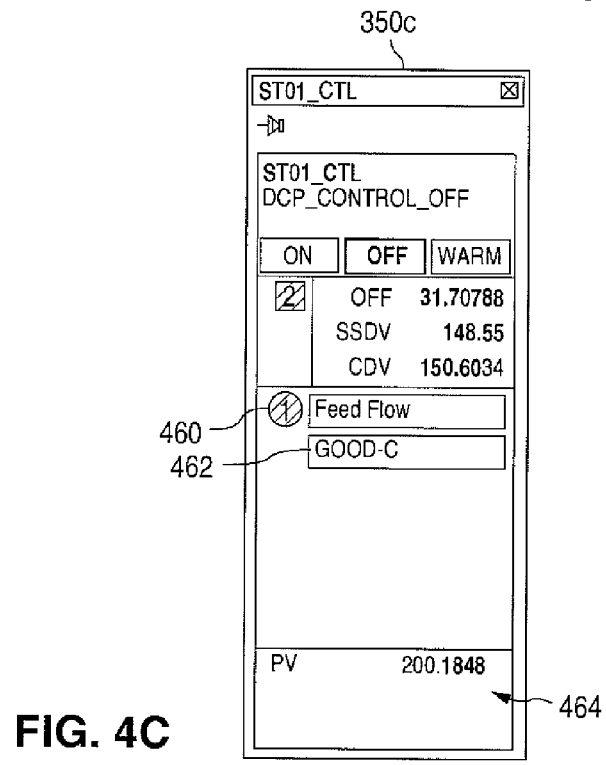

As noted above, an operator can select icons 230a-230f that are presented in the display 200. An icon in FIG. 2 can be selected in any suitable manner, such as when an operator clicks on the icon using a mouse or other input device. Selection of an icon in FIG. 2 may present the user with a faceplate 350 that, as shown in FIG. 3, is displayed in a window over the display 200. In this example, the faceplate 350 identifies various information associated with the selected icon 230a-230f, such as the name and status of a controller and the name and status of the process variable. The contents of the faceplate 350 may vary depending on whether the selected icon is associated with a controlled, manipulated, or disturbance variable. Examples of the different faceplates that could be presented to an operator are shown in FIGS. 4A through 4C, which are described below.

Using icons in this manner, a wide variety of information can be presented to an operator via the display 200. For example, various process variables can be identified within a graphical image representing a process (or portion thereof). This may allow the operator to quickly and easily identify where different process variables are located within a process. This can also illustrate to the operator which process variables are available for monitoring and control. The indicators used with the icons (such as shadings/colors, halo symbols, and symbols) can quickly inform the operator of the status of the process variables, allowing the operator to identify problems in a process being controlled. In addition, as described below, the icons and faceplates can be used to quickly and easily access more detailed information about the process variables, which can allow for a more logical flow of information to the operator.

As noted above, the faceplate 350 can be presented to an operator when an icon in the display 200 is selected. The contents of the faceplate 350 presented to the operator may vary depending on the type of process variable associated with the selected icon. FIGS. 4A through 4C illustrate examples of the faceplates that could be presented to the operator.

A faceplate 350a having the form shown in FIG. 4A could be displayed when a controlled variable's icon is selected by the operator. In this example, the upper portion of the faceplate 350a is associated with a controller, and the lower portion of the faceplate 350a is associated with the selected controlled variable. For example, the faceplate 350a includes a name 402 of a controller associated with the selected controlled variable, such as the name of the controller that is controlling or may control the selected controlled variable. The faceplate 350a also includes a status 404 of the controller and a mode 406 of the controller. The controller status 404 could, for instance, represent one of the statuses supported in the PROFIT CONTROLLER system from HONEYWELL INTERNATIONAL INC. The controller mode 406 in this example is on (the controller is controlling a process), off (the controller is not controlling a process), or warm (the controller is intended for commissioning and operating but is not altering any manipulated variables). The operator could alter the mode of the controller using the faceplate 350a.

The faceplate 350a also includes zero or more variable identifiers 408. The variable identifiers 408 indicate the number of variables used by the identified controller (and the presence of halo symbols can indicate whether these variables are nearing or violating their limits). In this example, the variable identifiers 408 include a square with a "2," indicating that two manipulated variables can be used to control the controlled variable associated with the faceplate 350a. Further, various control indicators 410 are provided in the faceplate 350a. The control indicators 410 provide various control-related information about the controller. In this example, the control-related information includes the overall response time (ORT), steady-state objective value (SSOV), and current objective value (COV) associated with the controller. These or other or additional control-related values could be determined in any suitable manner.

The remainder of the faceplate 350a deals with the specific controlled variable associated with the selected icon. For example, the faceplate 350a includes a variable name 412, which identifies the name of the controlled variable. The faceplate 350a also includes a type indicator 414, which identifies the type of the selected variable (in this case, a controlled variable). This can be the same status icon displayed in the display 200, so the indicator 414 can also provide controller variable status information. The faceplate 350a further includes a status indicator 416. For a controlled variable, the status indicator 416 could indicate whether the controlled variable is: initializing, inactive, good (the controller is receiving a good signal), dropped (the controller is not using the variable in a control solution), critical (a critical variable is bad), predicted (the controller is using a predicted variable value instead of an actual variable value), or wound up. A-C suffix can be used in the status indicator 416 to identify a critical controlled variable, or a variable that the controller is required to use.

Other information related to the specific controlled variable includes high and low limits 418, which define the desired range for the controlled variable. The limits 418 can be controlled by an operator, such as when the operator enters values into text boxes in the faceplate 350a. An indicator 420 can be used to indicate whether the actual value of the controlled variable is close to or violating that limit. For example, an up arrow can indicate that a limit is being ramped up, while a down arrow can indicate that the limit is being ramped down. A solid diamond can indicate that a hard limit has been reached, and an open diamond can indicate that a soft limit has been reached. Further, the faceplate 350a may present various control-related values 422 associated with the selected controlled variable. These values 422 could, for instance, include a read or last actual value (PV), a future or predicted value (FV), and a steady-state value (SS) of the controlled variable. In addition, a chart 424 may graph these values 422 with respect to the high and low limits 418 using different bars. In this example, the bars have different shadings, although any other suitable indicators could be used (such as different colors).

A faceplate 350b having the form shown in FIG. 4B could be displayed when a manipulated variable's icon is selected by the operator. In this example, the faceplate 350b includes some of the same or similar information as shown in FIG. 4A and described above, such as various controller and variable information. In this example, a type indicator 440 identifies the faceplate 350b as being associated with a manipulated variable. Also, because the faceplate 350b is associated with a manipulated variable, a status indicator 442 of the manipulated variable may take on different values from those described above. For manipulated variable, the status indicator 442 could indicate whether the manipulated variable is: initializing, on (the variable is available to a controller turned on), ready (the variable is available to a controller turned off), inactive, feed-forward (the variable is used as a feed-forward value), low (the variable is clamped low or is at its low limit), high (the variable is clamped high or is at its high limit), or severed (communication with a process has been lost, which could be ignored for non-critical variables).

A faceplate 350c having the form shown in FIG. 4C could be displayed when a disturbance variable's icon is selected by the operator. In this example, the faceplate 350c includes some of the same or similar information as shown in FIGS. 4A and 4B and described above, such as various controller and variable information. In this example, a type indicator 460 identifies the faceplate 350c as being associated with a disturbance variable. Also, because the faceplate 350c is associated with a disturbance variable, a status indicator 462 of the disturbance variable may take on different values than those described above. For a disturbance variable, the status indicator 462 could indicate whether the disturbance variable is: inactive, good, dropped, or critical. A-C suffix can be used in the status indicator 462 to identify a critical disturbance variable. In addition, one control-related value 464 (the actual value of the disturbance variable) is presented in the faceplate 350c, and this value may or may not be plotted in a chart.

Figure 5:
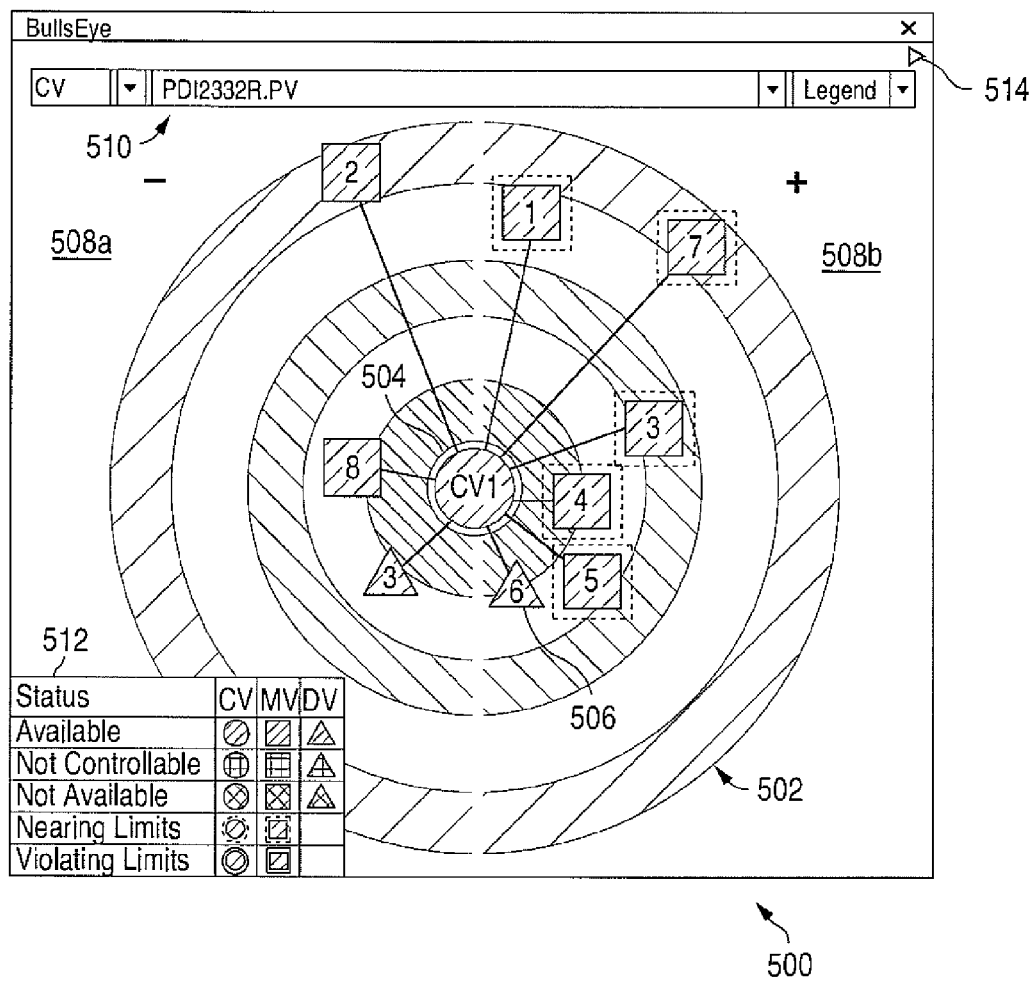

While faceplates are one type of display that can be presented to an operator, additional types of displays can also be presented to an operator. These displays could be accessible in any suitable manner, such as via the menu 204, toolbar 206, command line 208, or selection of process variable icons in the display 200. One example of an additional type of display is a "bull's eye" display, an example of which is shown in FIG. 5. This type of display could, for example, be displayed when the operator selects a particular process variable in various ones of the displays provided by the visualization GUI 144.

As shown in FIG. 5, a display 500 includes a set of concentric circles 502 forming a target. At the center of the concentric circles 502 is a focal variable symbol 504, which represents the process variable that is the focus of the display 500. Additional variable symbols 506 are displayed around the focal variable symbol 504 and represent process variables that are associated with the focal variable symbol 504. For example, if the focal variable symbol 504 is a controlled variable, the additional variable symbols 506 could represent manipulated variables used to control the controlled variable and disturbance variables affecting the controlled variable. If the focal variable symbol 504 is a manipulated variable, the additional variable symbols 506 could represent controlled variables that are controlled using that manipulated variable. If the focal variable symbol 504 is a disturbance variable, the additional variable symbols 506 could represent variables that are affected by that disturbance variable. Numerical identifiers in the additional variable symbols 506 can be used to distinguish the symbols 506 (and the process variables associated with the symbols 506).

The display 500 is also divided into two halves 508a-508b, which are associated with different gains or other defining process characteristics of the process variables. Gain is a model parameter that determines the magnitude and direction of the effect of an independent (manipulated or disturbance variable) on a dependent (controlled) variable. In many cases, this indicates the order of manipulated variable movement for a given constraint situation, so it is often important for an operator to know the gain values. Here, process variables with negative gains are identified by symbols 506 in the left half 508a of the display 500, and process variables with positive gains are identified by symbols 506 in the right half 508b of the display 500. Also, the distance of an additional variable symbol 506 from the focal variable symbol 504 is proportional to the gain value for the variable associated with that symbol 506. For example, additional variable symbols 506 that are closer to the focal variable symbol 504 may have a lower gain compared to additional variable symbols 506 that are farther from the focal variable symbol 504. In particular embodiments, the number of additional variable symbols 506 in the display 500 can be limited, such as to ten symbols. Although described as being associated with gains, the variable symbols could be associated with any other or additional defining process characteristic(s).

In this example, the display 500 includes various controls 510 for controlling the bull's eye display. For example, a drop-down menu can be used to select a type of variable (CV, MV, or DV), and another drop-down menu can be used to select the name of a specific process variable. That specific process variable can then be associated with the focal variable symbol 504, and the additional variable symbols 506 for that specific process variable can be presented in the display 500. Also, a legend button can be used to present a legend 512 to the operator. In this example, the symbols for the process variables are similar to the ones contained in FIG. 2.

Figure 6:
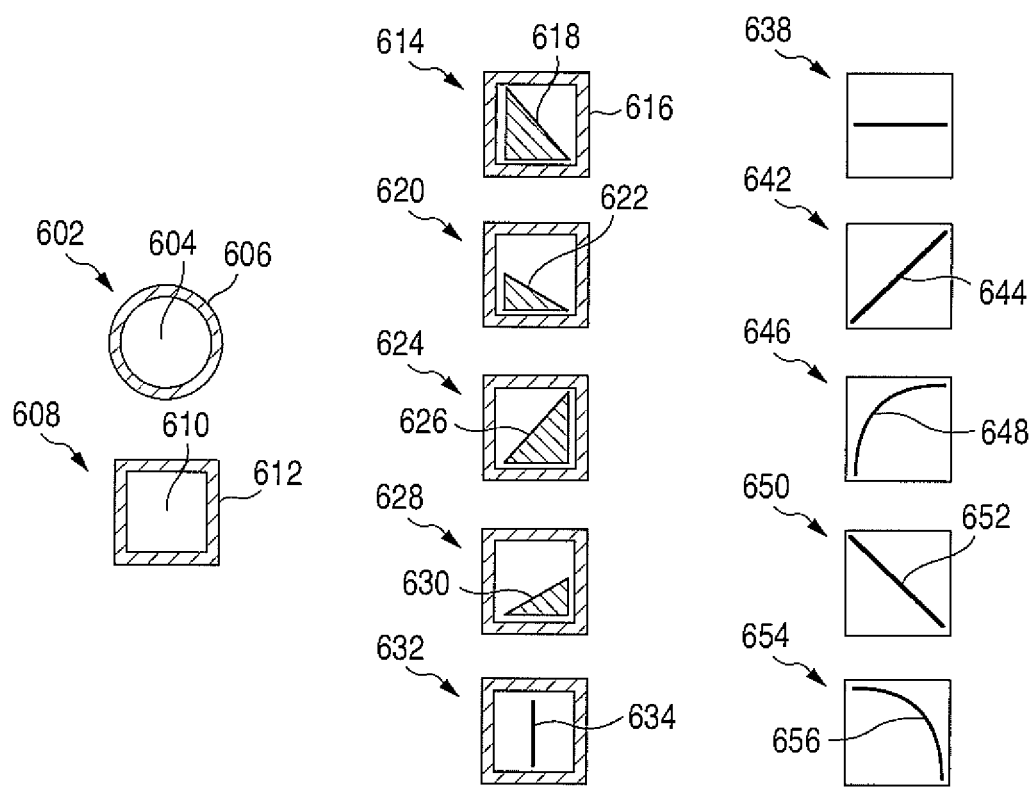

FIG. 6 illustrates icons for displaying status, deviation, and trajectory information related to associated process variables according to this disclosure. As discussed with reference to FIG. 2, icons 602 and 608 may be used to provide status information regarding current values of an associated controlled variable and an associated manipulated variable, respectively. As such, the icons 602 and 608 may be referred to as "status icons." Interiors 604 and 610 of the icons may be used to indicate availability, controllability, or other information related to the associated process variable. Halo symbols 606 and 612 of the icons may be used to indicate a relationship between a current value of the associated process variable and its set point limits. A red halo symbol may indicate a variable whose value has risen above its high limit or fallen below its low limit. A yellow halo symbol may indicate a variable whose value is approaching its high limit or low limit.

Icons 614, 620, 624, 628, 632 may be used to present information relating to a deviation of a process variable value from its set point limits. As such, the icons 614, 620, 624, 628, 632 may be referred to as "deviation icons." The icons 614 and 620 may be used to indicate a process variable whose value has dropped below its low limit. Symbols 618 and 622 may indicate that the value has dropped below the limit by a greater or lesser amount, respectively, as suggested by the relative slopes of the triangle symbols 618 and 622. The symbol 618 may indicate that the value is below the limit by an amount greater than a predetermined threshold, and the symbol 622 may indicate that the value is below the limit by an amount less than the predetermined threshold.

The icons 624 and 628 may be used to indicate a process variable whose value has exceeded its high limit. Symbols 626 and 630 may indicate that the value has exceeded the limit by a greater or lesser amount, respectively, as suggested by the relative slopes of the triangle symbols 626 and 630. The symbol 626 may indicate that the value is above the limit by an amount greater than the predetermined threshold, and the symbol 630 may indicate that the value is above the limit by an amount less than the predetermined threshold.

The icon 632 may be used to indicate a process variable whose value is approaching its limit, as indicated by a vertical line 634. For all of the icons 614, 620, 624, 628, 632, an optional halo symbol 616 may also be used to indicate the relationship between the current value of the associated process variable and its limits as described above for the icons 602 and 608. As such, the symbols 618, 622, 626, 630, and 634 may indicate a first characteristic of the relationship between the current value of the associated process variable and its limits and the halo symbol 616 may indicate a second characteristic of the relationship.

Icons 638, 642, 646, 650, 654 may be used to present information relating to a trajectory of a process variable relative to its set point limits. As such, the icons 638, 642, 646, 650, 654 may be referred to as "trajectory icons." The icon 638 may be used to indicate a process variable whose value is remaining steady or unchanging as indicated by a horizontal line 640. The icons 642 and 646 may be used to indicate a process variable whose value is increasing. Symbol 644 may indicate that the value is increasing approximately linearly as suggested by a straight line rising from left to right. Symbol 648 may indicate that the value is increasing approximately exponentially as suggested by a curved line rising from left to right. The icons 650 and 654 may be used to indicate a process variable whose value is decreasing. Symbol 652 may indicate that the value is decreasing approximately linearly as suggested by a straight line falling from left to right. Symbol 656 may indicate that the value is decreasing approximately exponentially as suggested by a curved line falling from left to right.

The symbols 640, 644, 648, 652, 656 may use color to indicate the relationship between the current value of the associated process variable and its limits, possibly in a similar manner as described above for the halo symbols of the icons 602, 608, 614, 620, 624, 628, 632. In other embodiments, the icons 638, 642, 646, 650, 654 may have halo symbols as described above for the icons 602, 608, 614, 620, 624, 628, 632.

In still other embodiments, the colors of the symbols 640, 644, 648, 652, 656 or the colors of halo symbols of the icons 638, 642, 646, 650, 654 may be used to indicate a relationship between a predicted value of an associated process variable and its limits. For example, the color blue may be used to indicate that the value is predicted to remain within its limits. The color yellow may be used to indicate that the value is predicted to approach its limits. The color red may be used to indicate that the value is predicted to exceed its limits.

While specific colors have been presented in this disclosure for halo symbols of icons and for symbols, it will be understood that in other embodiments other colors or other indicators may be used. Also, while specific symbols have been presented in this disclosure for icons, it will be understood that in other embodiments other symbols may be used to present deviation and/or trajectory information.

In other embodiments, icons and symbols similar to those presented in FIG. 6 may be used to present information relating to a status, deviation, and/or trajectory of a process variable relative to its optimal steady state value. In such embodiments, the icons 602 and 608, the symbols 618, 622, 626, 630, 634, and the symbols 640, 644, 648, 654, 656 may be used to indicate status, deviation, and trajectory information, respectively. In such embodiments, an additional shading, color, pattern or other graphical indication may be used to indicate that the icons are presenting information relating to optimal steady state values, rather than set point limit values.

The icons of FIG. 6 may be used in the graphical display of FIG. 2, the bull's eye display of FIG. 5, or in any other suitable display of the process control system 100. In embodiments presenting a display utilizing the icons of FIG. 6, additional controls can be provided to select whether the status, deviation, or trajectory icons are to be displayed, as well as whether the icons present information relating to limit values or optimal steady state values. In some embodiments, such controls allow a user to cycle between status, deviation, and trajectory icons in a predefined sequence. Such a sequence may include some or all of the status, deviation, and trajectory limit value icons and status, deviation, and trajectory optimal steady state value icons. In other embodiments, the user arbitrarily identifies which of the types of icons to view using, for instance, graphical buttons or drop down menus. For either sequenced or arbitrary icon selection, some embodiments provide physical buttons to step through sequences or identify the desired icon types.

Figure 7:
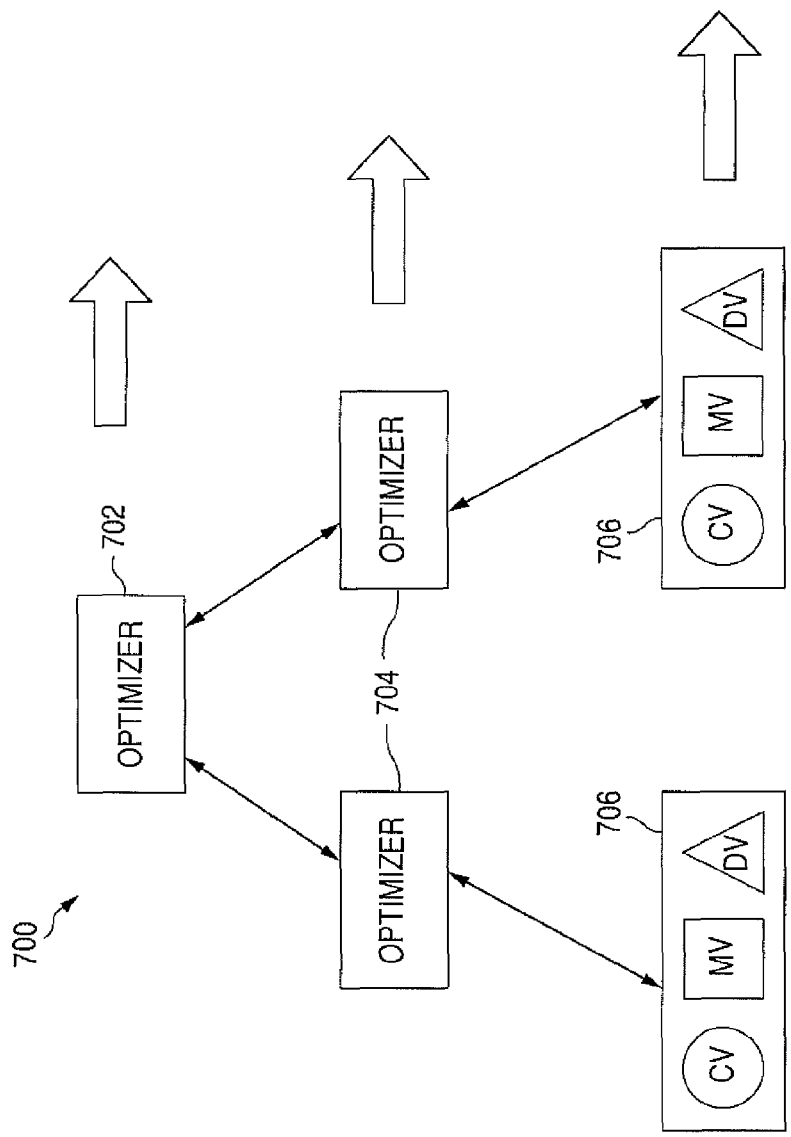

FIG. 7 illustrates an example architecture for use in a process control application 700. The components in the process control application 700 could, for example, be performed by one or more controllers 106a-106b and/or one or more servers 114a-114b, 126 in FIG. 1. As shown in FIG. 7, an optimizer application 702 implements optimal operating conditions plant-wide across multiple process units. The optimizer 702 communicates with one or more process controllers 704. Each process controller 704 in this example is a multiple input/multiple output (MIMO) application that provides multivariable control over an associated process or portion thereof. Each process controller 704 can receive information relating to desired economics and ideal target values and control its process accordingly. The process controllers 704 each have an associated set of process variables 706 within or associated with the process under control. Each process controller 704 can generate control values for manipulated variables in response to measured values for controlled variables and disturbance variables. The optimizer application 702, the process controllers 704, and the variables 706 may be referred to as building blocks of the process control application 700.

Figure 8:
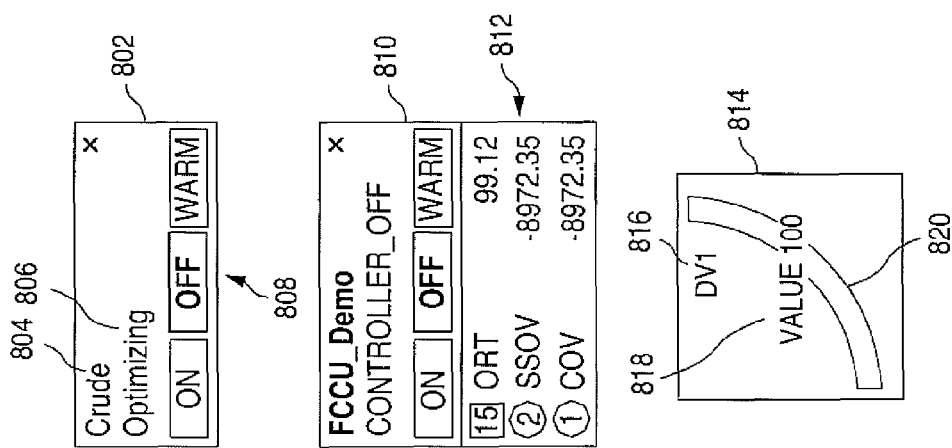

FIG. 8 illustrates example visual elements associated with the building blocks in the process control application 700 according to this disclosure. A visual element 802 for the optimizer 702 presents a name 804, one or more status indications 806, and one or more controls 808 for the optimizer 702. A visual element 810 for one of the process controllers 704 presents a name, one or more status indications, and one or more controls for the process controller 704. The visual element 810 also presents information 812 relating to the manipulated, controlled, and disturbance variables associated with the process controller 704. The information 812 may be presented as aggregate process variable information or as information about individual process variables. A visual element 814 presents information about one of the process variables 706, including an identifier 816, a textual representation 818 of a characteristic of the process variable (in this example, a value), and a graphical representation 820 of another characteristic of the process variable (in this example, a trajectory for the value).

While specific combinations of textual and graphical representations have been shown in FIG. 8, it will be understood that in other embodiments, other combinations may be used. For example, characteristics presented textually in FIG. 8 may be presented graphically, and characteristics presented graphically may be presented textually.

Figure 9:
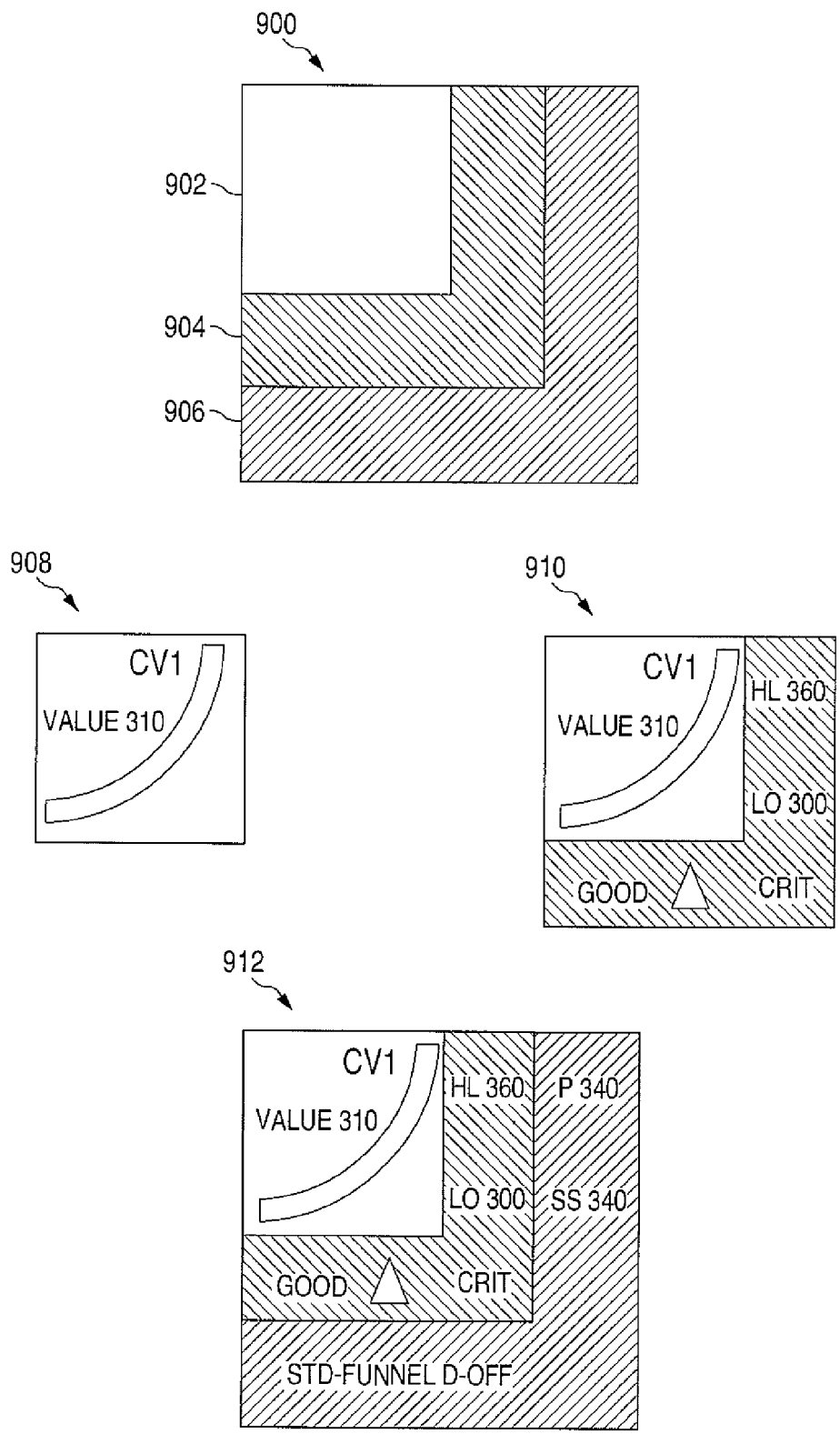

FIG. 9 illustrates an example visual element 900 providing a layered presentation of details according to this disclosure. In this example, the visual element 900 presents building block information in three layers 902-906. Each layer 902-906 provides more detailed information about the building block represented by the visual element. Core information is presented in the first layer 902, which may represent the smallest of the visual elements. Where the building block is more critical to control of a process or where more screen space is available, a visual element presenting two or three layers of information may be used.

A visual element 908 presents a first layer representation of a controlled variable. An identifier, current value, and trajectory are represented. A visual element 910 presents an additional layer of information. The first layer information from the visual element 908 is presented and a second layer is added, indicating high and low set point limits for the controlled variable, an indication that the controlled variable value is currently in a "good" range, and an indication that the controlled variable has been characterized as a "critical" variable for its process controller. A visual element 912 presents an additional layer of information. The first and second layer information from the visual element 910 is presented and a third layer is added, indicating a steady state optimal value for the controlled variable and a subsystem of the process represented by the controlled variable.

While specific combinations of textual and graphical representations have been shown in FIG. 9, it will be understood that in other embodiments, other combinations may be used. For example, characteristics presented textually in FIG. 9 may be presented graphically, and characteristics presented graphically may be presented textually. The textual and graphical elements of the visual elements of FIG. 9 may be presented in black, white, or other color as a system designer may choose according to a value or type of information being displayed. In addition, any number of layers can be used in a layered presentation.

Figure 10:
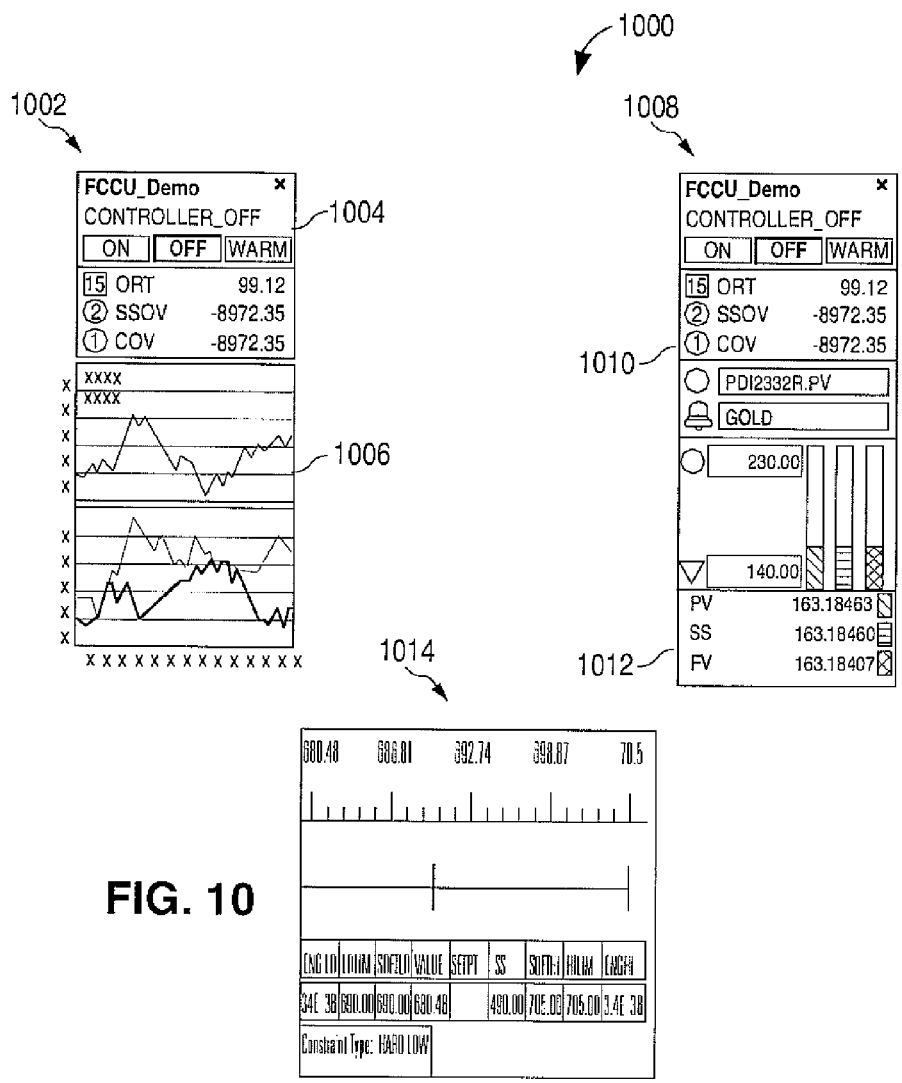

FIG. 10 illustrates example peephole displays 1000 presenting different views of a process control application according to the disclosure. Traditionally, a peephole may be a physical viewing port through which an operator can view an aspect of the system under control. In a furnace, a first peephole may be used to observe the flame color, and a second peephole may be used to observe residue collection. The peephole displays 1000 provide views of the process controller that are configured according to a role played by a user of the process controller.

A peephole 1002 may be used by a manager and provide a section 1004 with current status information on a process controller and a section 1006 with historical information on the process controller. A peephole 1008 may be used by an engineer to observe current status information on the process controller. The peephole 1008 provides a section 1010 with information presented numerically and a section 1012 with information presented graphically in the form of bar graphs. A peephole 1014 may be used by an operator to observe current information on a process variable. The peephole 1014 presents a current value of the variable as an indicator on an analog scale, as well as setpoint limits and other information in numeric format.

Figure 11:
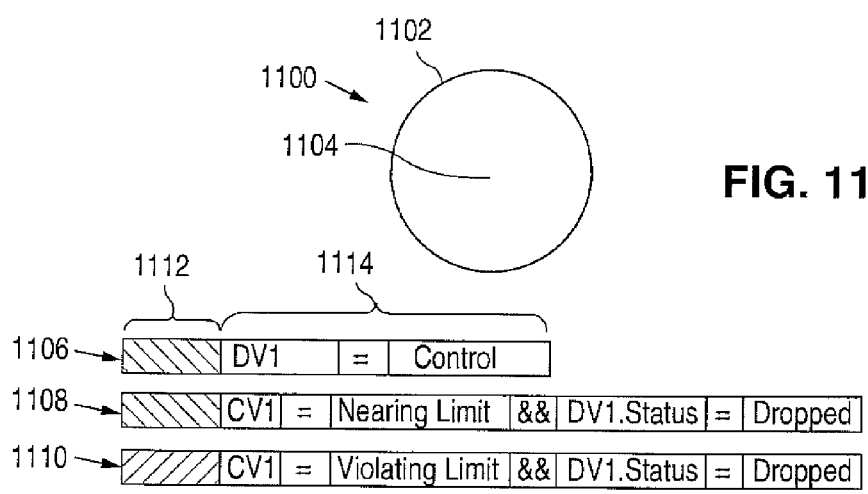

FIG. 11 illustrates a custom blinker 1100 according to this disclosure. A frame 1102 surrounds a blinker indicator 1104. The blinker indicator 1104 is controlled by a set of rules 1106-1110. Each of the rules 1106-1110 can include a section 1112 that specifies a color and a behavior for the blinker indicator 1104 when one or more criteria as specified in a section 1114 are met.

According to the rule 1106, when a disturbance variable identified as "DV1" has a status value of "control," the blinker indicator 1104 has a steady first color (such as green). According to the rule 1108, the blinker indicator 1104 has a steady second color (such as yellow) when two criteria are true: (i) a controlled variable identified as "CV1" has a status value in a range defined as "nearing limit" and (ii) the disturbance variable DV1 has a status value of "dropped." According to the rule 1110, the blinker indicator 1104 has a third color (such as red) and flashes on-off when two criteria are true: (i) the controlled variable CV1 has a status value in a range defined as "violating limit" and (ii) the disturbance variable DV1 has the status value dropped.

The custom blinker 1100 provides a system designer of a process control system user interface with an improved tool for directing an operator's attention to a desired portion of the user interface. In some circumstances, a controlled variable violating its limit may not be a condition requiring the operator's attention, unless it occurs when an associated disturbance variable has been dropped. In such circumstances, the custom blinker 1100, using the rule 1108, enables the system designer to generate a user interface that does not change state until the user's attention is actually required.

Figure 12:
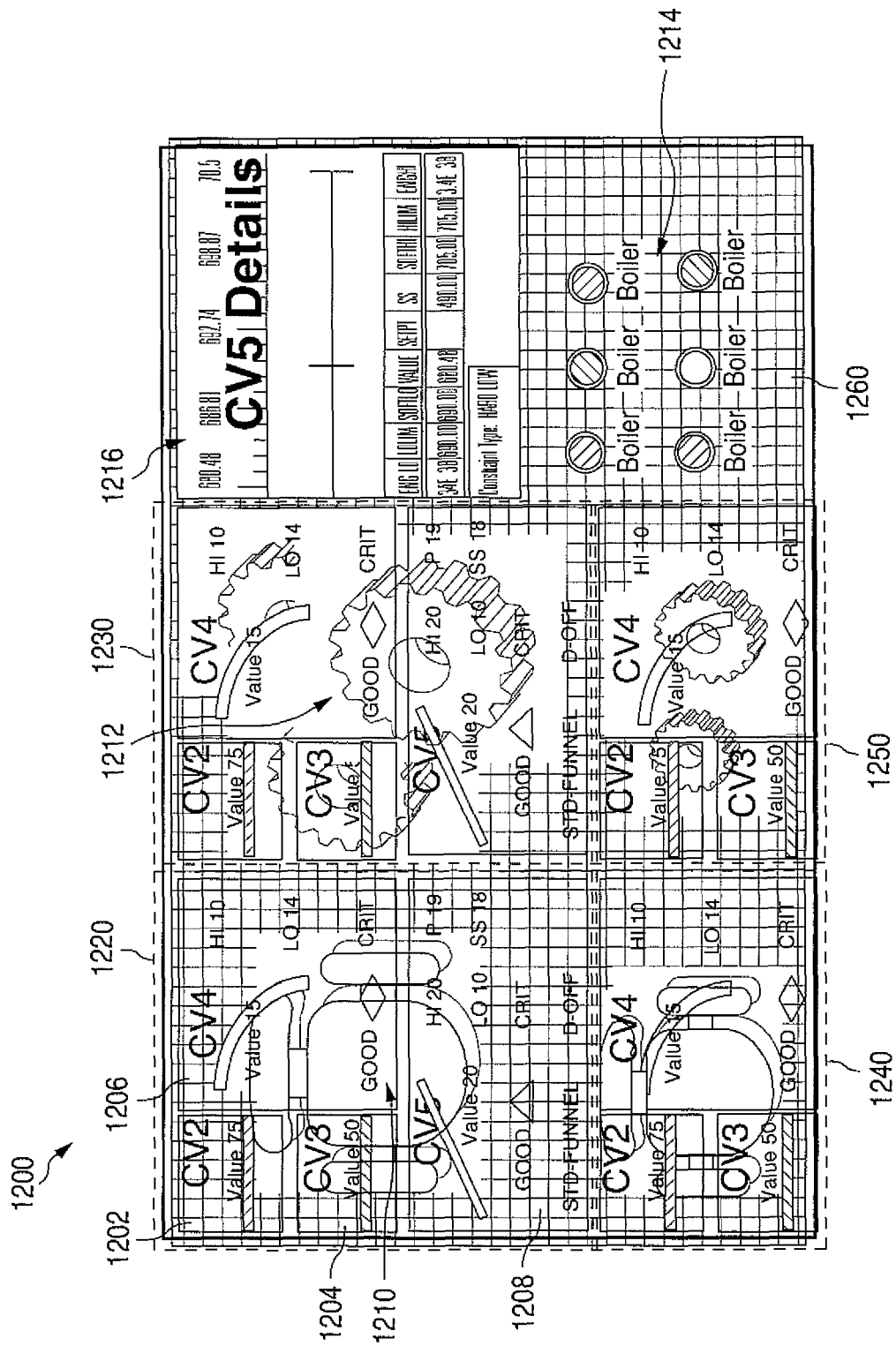

FIG. 12 illustrates an example display 1200, which may be referred to as a "pigeonhole" display, according to this disclosure. In embodiments where the pigeonhole display 1200 is combined with other types of displays, a grid 1260 can be displayed to identify and distinguish the pigeonhole display region from a region of textual display or graphical display of another type. The pigeonhole display 1200 may be used by a system designer to display information relative to a related group of subsystems of a process under control. Logical group regions 1220-1250 are located in a first portion of the pigeonhole display 1200. The logical group regions 1220-1250 present information relating to, respectively, first through fourth process controllers that the designer chooses to present together to the operator.

The logical group region 1220 displays controlled variables CV2 and CV3 using first layer visual elements 1202 and 1204, respectively, controlled variable CV4 using a second layer visual element 1206, and controlled variable CV5 using a third layer visual element 1208. This visual element format is similar to that shown in FIG. 9 above. The logical group region 1220 also includes a graphical element 1210, which may be referred to as a "watermark." The watermark 1210 provides the operator with a graphical indication of the type of process controller to which the controlled variables CV2, CV3, CV4, and CV5 are related. A watermark may be a graphical illustration of the subsystem it represents as shown by the watermark 1210, or it may present an arbitrary graphic as shown by a watermark 1212 (which is in the shape of a gear).

A group of custom blinker displays 1214 may be located in a second portion of the pigeonhole display 1200. The process variables whose status is reflected in the blinker displays 1214 can be the same variables whose status is also displayed in the visual elements of the logical group regions 1220-1250. In other embodiments, one or more of the blinker displays 1214 may relate to variables whose status is displayed in another display screen of the associated process control system in order to draw the operator's attention to the other screen.

In a third portion of the pigeonhole display 1200, a peephole display 1216 is presented (in this case, when the visual element 1208 is selected by the operator). The peephole display 1216 presents additional information about the process variable associated with the selected visual element. The type of peephole presented may be chosen based upon a role of the operator or upon a control signal provided by the operator when selecting the visual element 1208. When the operator selects another visual element, a peephole display related to the selected visual element's associated process variable replaces the peephole 1216 in the third portion of the pigeonhole display 1200.

Figure 13:
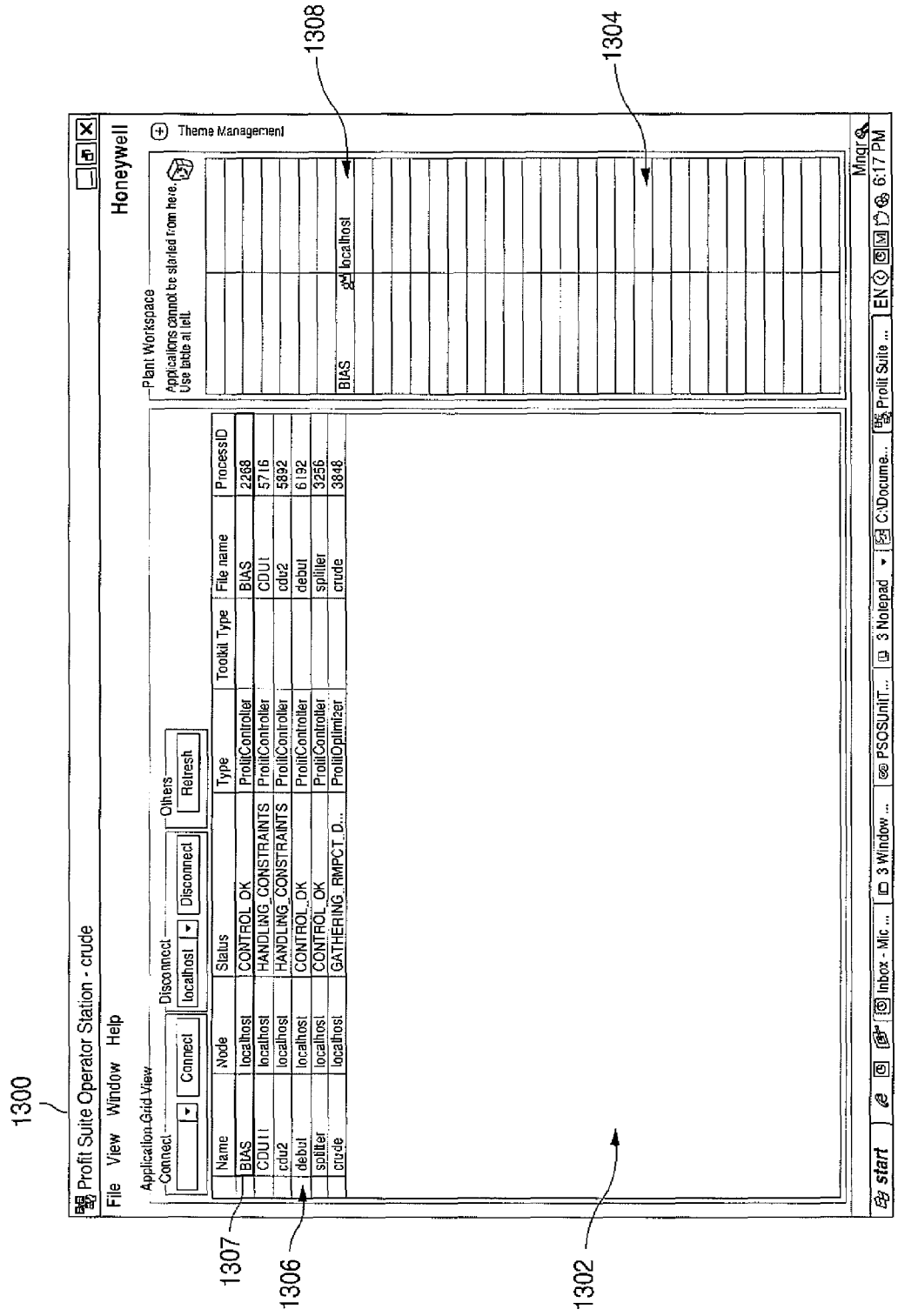

FIG. 13 illustrates a display 1300 that presents information relating to an application of a process control system according to this disclosure. A display area 1302 provides a tabular listing of process controllers 1306 associated with the application. When an operator selects a specific process controller 1307, a display area 1304 provides additional information 1308 about the selected process controller 1307.

Figure 14:
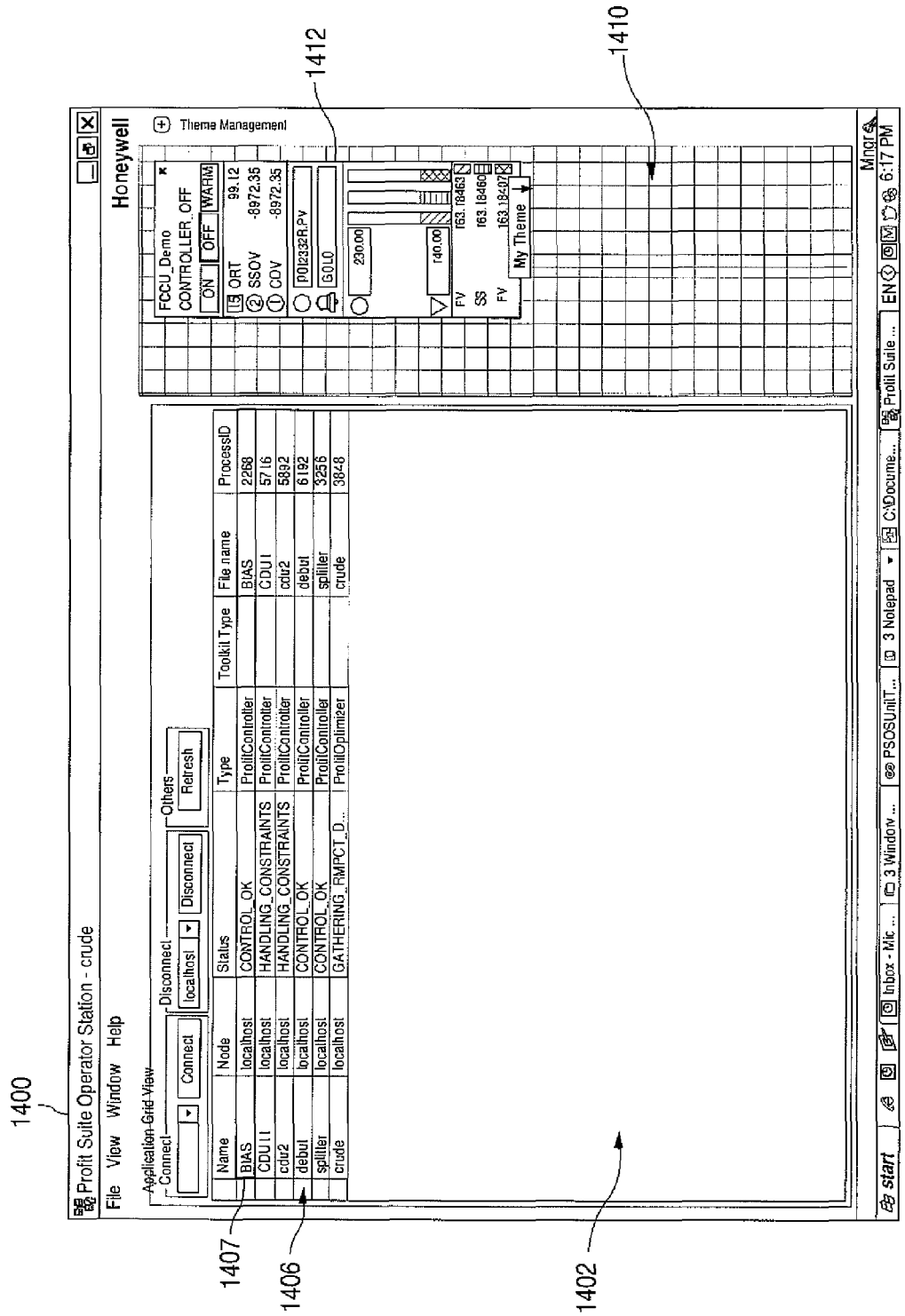

FIG. 14 illustrates another display 1400 that presents information relating to an application of a process control system according to this disclosure. The operator may activate the display 1400 while viewing the display 1300 of FIG. 13. In the display 1400, a display area 1402 provides a tabular listing of process controllers 1406 associated with the application. A pigeonhole display 1410 replaces the tabular display of display area 1304. The operator may select a specific process controller 1407, drag the specific controller into the pigeonhole display 1410, and release in order to position a peephole display 1412 in the pigeonhole display 1410. The peephole display 1412 presents information relating to the specific process controller 1407. The type of peephole display 1412 presented in the pigeonhole display 1410 may be selected according to a type of process controller 1407, a role of the operator, or a stored preference of the operator.

Figure 15:
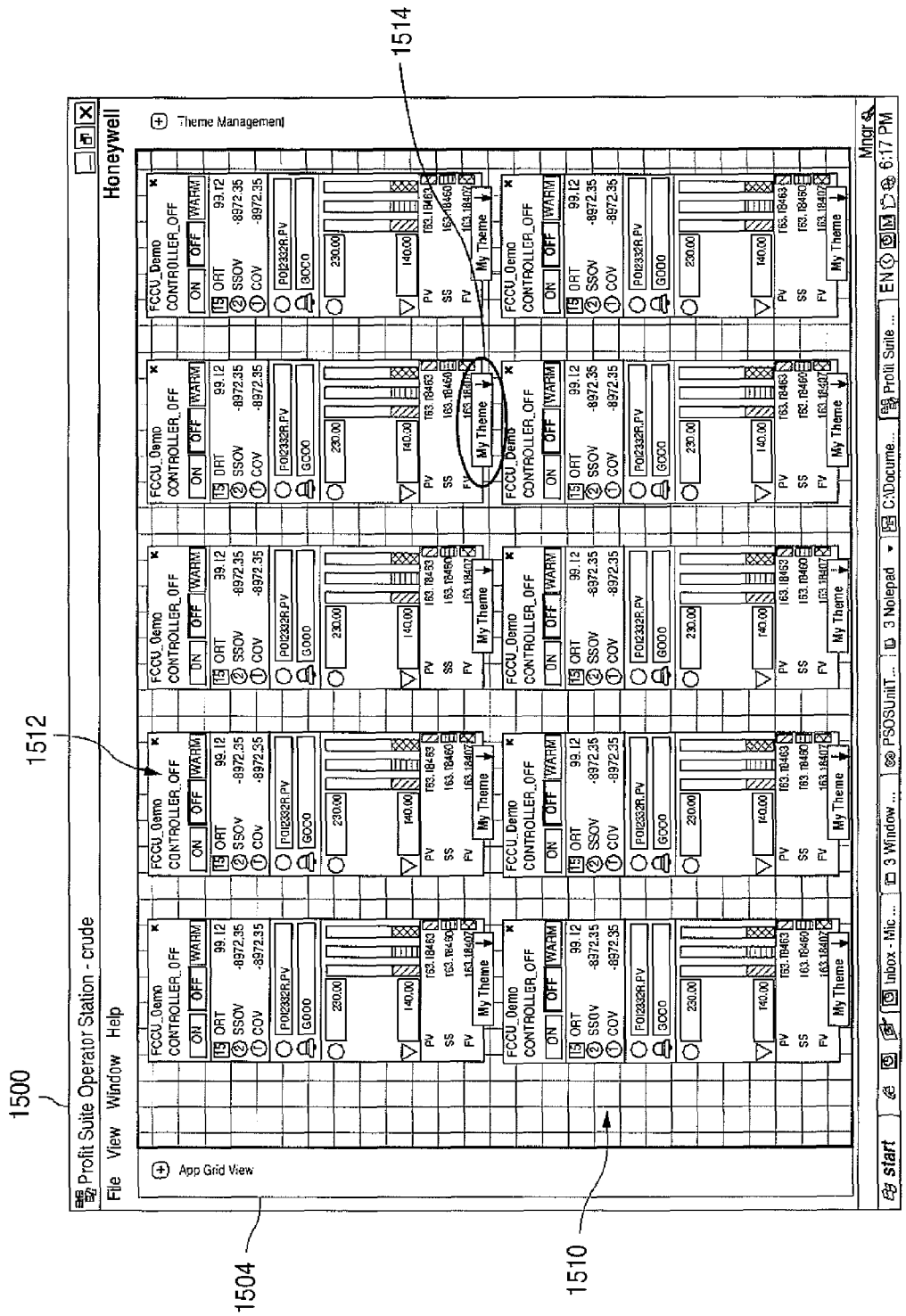

FIG. 15 illustrates an example display 1500 that presents a view of information relating to some or all of the process controllers 1406 shown in FIG. 14 according to this disclosure. The operator may activate the display 1500 while viewing the display 1400 of FIG. 14, for instance. In FIG. 15, the display area 1402 has collapsed into a display activation control 1504, and the pigeonhole display 1410 has expanded into a pigeonhole display 1510. Multiple peephole displays 1512 are presented in the pigeonhole display 1510, displaying information relating to some or all of the process controllers 1406. A control 1514 provides the operator a way to activate a display that provides further information relating to a process controller associated with a selected one of the peephole displays 1512. Selection of this control 1514 can open a display shown in FIG. 16.

Figure 16:
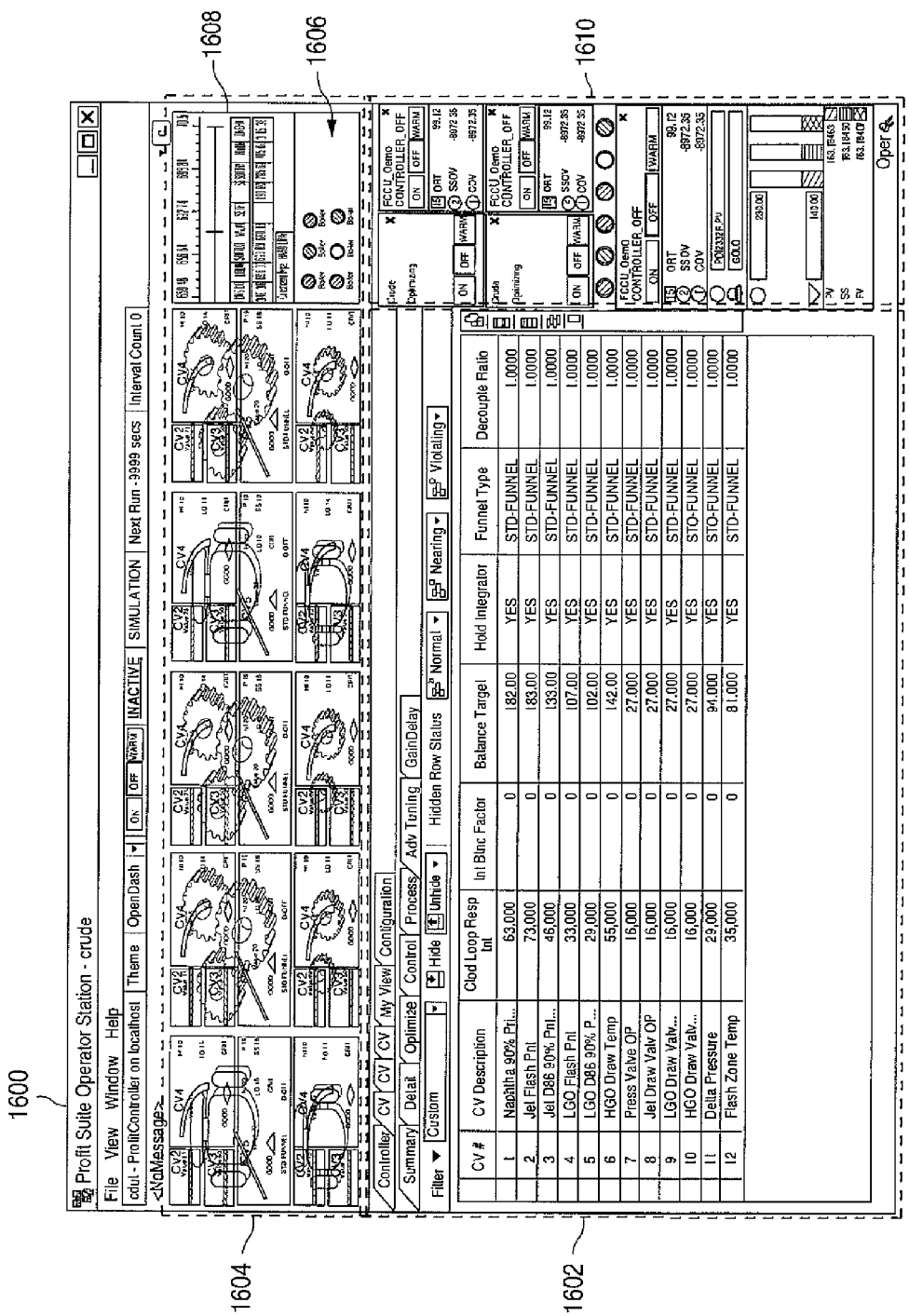

FIG. 16 illustrates an example display 1600 that presents a view of information relating to a process controller according to this disclosure. A display area 1602 presents a tabular view of information relating to controlled variables of the process controller. A pigeonhole display area 1604 presents visual elements relating to the controlled variables of the process controller. The operator may select a controlled variable in the display area 1602, drag the controlled variable into the pigeonhole display 1604, and release in order to position a visual element relating to the selected controlled variable in the pigeonhole display 1604. The operator may also position custom blinker displays 1606 in the pigeonhole display 1604. As described with reference to FIG. 12, the operator may select a visual element in the pigeonhole display 1604 and view information relating to an associated controlled variable in a peephole display 1608.

In a display area 1610, the operator may view information relating to other applications or optimizers of the process control system. As visual elements are selected in the pigeonhole display 1604, the display area 1610 may change to display information relating to an application or optimizer related to the selected controlled variable or to the process controller associated with the controlled variable.

Although FIGS. 2 through 16 have illustrated various details of example GUIs, various changes may be made to these figures. For example, any other GUIs could be used to collect relevant information from or present relevant information to one or more users.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. Terms like "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
presenting a first pigeonhole display to an operator on an operator station, the first pigeonhole display comprising a set of visual elements associated with a corresponding set of process variables, the process variables associated with at least a portion of an industrial process;
receiving from the operator a selection of at least one of the visual elements; and
presenting a first peephole display to the operator within the first pigeonhole display, the first peephole display comprising information associated with at least one of the process variables that are associated with at least one of the selected visual elements;
wherein each visual element displays one or more layers of information associated with the associated process variable; and
wherein the method further comprises:
displaying one or more of the process variables;
receiving from the operator a selection of at least one of the one or more process variables;
adding at least one visual element associated with the at least one selected process variable to the set of visual elements.

2. The method of claim 1, wherein each visual element displays one of (i) a first layer of information, (ii) the first layer and a second layer of information, and (iii) the first layer, the second layer, and a third layer of information.

3. The method of claim 1, the first pigeonhole display further comprising one or more blinkers, at least one of the blinkers comprising an indicator whose appearance is based on a status of a plurality of the process variables.

4. The method of claim 3, wherein the indicator has a first appearance based on a first set of criteria and a second appearance based on a second set of criteria.

5. The method of claim 1, further comprising:
presenting a second pigeonhole display to the operator, the second pigeonhole display comprising a set of second peephole displays associated with a corresponding set of process controllers that are associated with the process; and
receiving from the operator a selection of at least one of the second peephole displays;
wherein presenting the first pigeonhole display to the operator comprises presenting the first pigeonhole display to the operator in response to the received selection of the at least one second peephole display; and
wherein the visual elements of the first pigeonhole display are associated with process variables that are related to the at least one process controller associated with the at least one selected second peephole display.

6. The method of claim 5, further comprising:
displaying one or more of the process controllers;
receiving from the operator a selection of at least one of the one or more process controllers; and
adding at least one peephole display associated with the at least one selected process controller to the set of second peephole displays.

7. The method of claim 1, wherein:
one of the visual elements is configured to present first, second, and third layers of information;
the first layer of information includes an identifier, a current value, and a trajectory of the process variable associated with the visual element;
the second layer of information identifies high and low set point limits for the process variable, an indication of a range in which a value of the process variable lies, and an indication of a criticality of the process variable; and
the third layer of information identifies a steady state optimal value for the process variable and a subsystem of the industrial process associated with the process variable.

8. A non-transitory computer readable storage medium embodying a computer program, the computer program comprising computer readable program code for:
presenting a first pigeonhole display to an operator, the first pigeonhole display comprising a set of visual elements associated with a corresponding set of process variables, the process variables associated with at least a portion of an industrial process;
receiving from the operator a selection of at least one of the visual elements; and presenting a first peephole display to the operator within the first pigeonhole display, the first peephole display comprising information associated with at least one of the process variables that are associated with at least one of the selected visual elements;

wherein each visual element displays one or more layers of information associated with the associated process variable; and wherein the computer program further comprises computer readable program code for:
presenting one or more of the process variables;
receiving from the operator a selection of at least one of the one or more process variables;
adding at least one visual element associated with the at least one selected process variable to the set of visual elements.

9. The computer readable storage medium of claim 8, wherein a number of layers displayed by each visual element is related to a measure of criticality of the process variable associated with that visual element in the industrial process.

10. The computer readable storage medium of claim 8, wherein:
the first pigeonhole display further comprises one or more blinkers, at least one of the blinkers comprising an indicator whose appearance is based on a status of a plurality of the process variables; and
the indicator has a first appearance based on a first set of criteria and a second appearance based on a second set of criteria.

11. The computer readable storage medium of claim 8, the computer program further comprising computer readable program code for:
presenting a second pigeonhole display to the operator, the second pigeonhole display comprising a set of second peephole displays associated with a corresponding set of process controllers that are associated with the process; and
receiving from the operator a selection of at least one of the second peephole displays;
wherein the first pigeonhole display is presented to the operator in response to the received selection of the at least one second peephole display; and
wherein the visual elements of the first pigeonhole display are associated with process variables that are related to the at least one process controller associated with the at least one selected second peephole display.

12. The computer readable storage medium of claim 11, the computer program further comprising computer readable program code for:
displaying one or more of the process controllers;
receiving from the operator a selection of at least one of the one or more process controllers; and
adding at least one peephole display associated with the at least one selected process controller to the set of second peephole displays.

13. The computer readable storage medium of claim 8, wherein:
one of the visual elements is configured to present first, second, and third layers of information;
the first layer of information includes an identifier, a current value, and a trajectory of the process variable associated with the visual element;
the second layer of information identifies high and low set point limits for the process variable, an indication of a range in which a value of the process variable lies, and an indication of a criticality of the process variable; and
the third layer of information identifies a steady state optimal value for the process variable and a subsystem of the industrial process associated with the process variable.

14. An apparatus comprising at least one processing device configured to:
generate a first pigeonhole display for presentation to an operator, the first pigeonhole display comprising a set of visual elements associated with a corresponding set of process variables, the process variables associated with at least a portion of an industrial process;
receive from the operator a selection of at least one of the visual elements; and
generate a first peephole display for presentation to the operator within the first pigeonhole display, the first peephole display comprising information associated with at least one of the process variables that are associated with at least one of the selected visual elements;
wherein each visual element is configured to present one or more layers of information associated with the associated process variable; and
wherein the at least one processing device is further configured to:
receive from the operator a selection of at least one of the process variables;
add at least one visual element associated with the at least one selected process variable to the set of visual elements.

15. The apparatus of claim 14, wherein each visual element is configured to present one of (i) a first layer of information, (ii) the first layer and a second layer of information, and (iii) the first layer, the second layer, and a third layer of information.

16. The apparatus of claim 14, wherein the first pigeonhole display further comprises one or more blinkers, at least one of the blinkers comprising an indicator whose appearance is based on a status of a plurality of the process variables.

17. The apparatus of claim 14, wherein the at least one processing device is further configured to:
generate a second pigeonhole display for presentation to the operator, the second pigeonhole display comprising a set of second peephole displays associated with a corresponding set of process controllers that are associated with the process; and
receive from the operator a selection of at least one of the second peephole displays;
wherein the at least one processing device is configured to generate the first pigeonhole display in response to the received selection of the at least one second peephole display; and
wherein the visual elements of the first pigeonhole display are associated with process variables that are related to the at least one process controller associated with the at least one selected second peephole display.

18. The apparatus of claim 17, wherein the at least one processing device is further configured to:
receive from the operator a selection of at least one of the process controllers; and
add at least one peephole display associated with the at least one selected process controller to the set of second peephole displays.

19. An apparatus comprising at least one processing device configured to:
generate a first pigeonhole display for presentation to an operator, the first pigeonhole display comprising a set of visual elements associated with a corresponding set of process variables, the process variables associated with at least a portion of an industrial process;

receive from the operator a selection of at least one of the visual elements; and generate a first peephole display for presentation to the operator within the first pigeonhole display, the first peephole display comprising information associated with at least one of the process variables that are associated with at least one of the selected visual elements;

wherein each visual element is configured to present one or more layers of information associated with the associated process variable;

wherein one of the visual elements is configured to present first, second, and third layers of information;

wherein the first layer of information includes an identifier, a current value, and a trajectory of the process variable associated with the visual element;

wherein the second layer of information identifies high and low set point limits for the process variable, an indication of a range in which a value of the process variable lies, and an indication of a criticality of the process variable; and wherein the third layer of information identifies a steady state optimal value for the process variable and a subsystem of the industrial process associated with the process variable.

20. A non-transitory computer readable storage medium embodying a computer program, the computer program comprising computer readable program code for:

generating a pigeonhole display for presentation to an operator, the pigeonhole display comprising a set of visual elements associated with a corresponding set of process variables, the process variables associated with at least a portion of an industrial process;

receiving from the operator a selection of at least one of the visual elements; and generating a peephole display for presentation to the operator within the pigeonhole display, the peephole display comprising information associated with at least one of the process variables that are associated with at least one of the selected visual elements;

wherein each visual element displays one or more layers of information associated with the associated process variable;

wherein one of the visual elements is configured to present first, second, and third layers of information;

wherein the first layer of information includes an identifier, a current value, and a trajectory of the process variable associated with the visual element;

wherein the second layer of information identifies high and low set point limits for the process variable, an indication of a range in which a value of the process variable lies, and an indication of a criticality of the process variable; and wherein the third layer of information identifies a steady state optimal value for the process variable and a subsystem of the industrial process associated with the process variable.

* * * * *